(12) United States Patent
Ennis

(10) Patent No.: US 7,293,315 B2
(45) Date of Patent: Nov. 13, 2007

(54) DELAY AND ACCELERATING MECHANISM FOR A WRAP-AROUND BRUSH ASSEMBLY IN A VEHICLE WASHING APPARATUS

(76) Inventor: G. Thomas Ennis, 235 W. Florence Ave., Inglewood, CA (US) 90301

( * ) Notice: Subject to any disclaimer, the term of this patent is extended or adjusted under 35 U.S.C. 154(b) by 753 days.

(21) Appl. No.: 10/830,141

(22) Filed: Apr. 23, 2004

(65) Prior Publication Data
US 2005/0235441 A1 Oct. 27, 2005

(51) Int. Cl.
*B60S 3/06* (2006.01)
(52) U.S. Cl. .................. 15/53.3; 15/53.2; 15/DIG. 2
(58) Field of Classification Search ............. 15/53.2, 15/53.3, 97.3, DIG. 2
See application file for complete search history.

(56) References Cited

U.S. PATENT DOCUMENTS

| | | | |
|---|---|---|---|
| 3,432,870 A | 3/1969 | Emanuel et al. | |
| 3,479,678 A | 11/1969 | Jeffreys | |
| 3,755,844 A | 9/1973 | Ennis | |
| 3,816,869 A * | 6/1974 | Ennis | 15/53.3 |
| 3,881,208 A * | 5/1975 | Miner | 15/53.3 |
| 3,926,663 A | 12/1975 | Gray | |
| 3,942,207 A | 3/1976 | Weigele et al. | |
| 4,225,995 A | 10/1980 | Ennis | |
| 4,305,174 A | 12/1981 | Pyle et al. | |
| 5,367,736 A | 11/1994 | Kaady et al. | |
| 5,715,558 A | 2/1998 | Johnson | |

* cited by examiner

*Primary Examiner*—Randall Chin
(74) *Attorney, Agent, or Firm*—Mattingly, Stanger, Malur & Brundidge, PC

(57) ABSTRACT

A brush support arm delay and accelerating mechanism for a vehicle washing apparatus having a supporting frame with an upper frame member extending over the path of a vehicle to be washed, includes a mounting arm attached to the upper frame member and having a bracket pivotally mounted thereto with a spring biasing means connected between the bracket and the mounting arm. A pair of bumpers are mounted on the bracket so that one of the bumpers contacts the brush support arm during outward pivotal movement of the brush support arm to retard the outward pivotal movement thereof and the other of the bumpers contacts the brush support arm during inward pivotal movement of the brush support arm to accelerate the inward pivotal movement of the brush support arm during a vehicle washing operation.

11 Claims, 5 Drawing Sheets

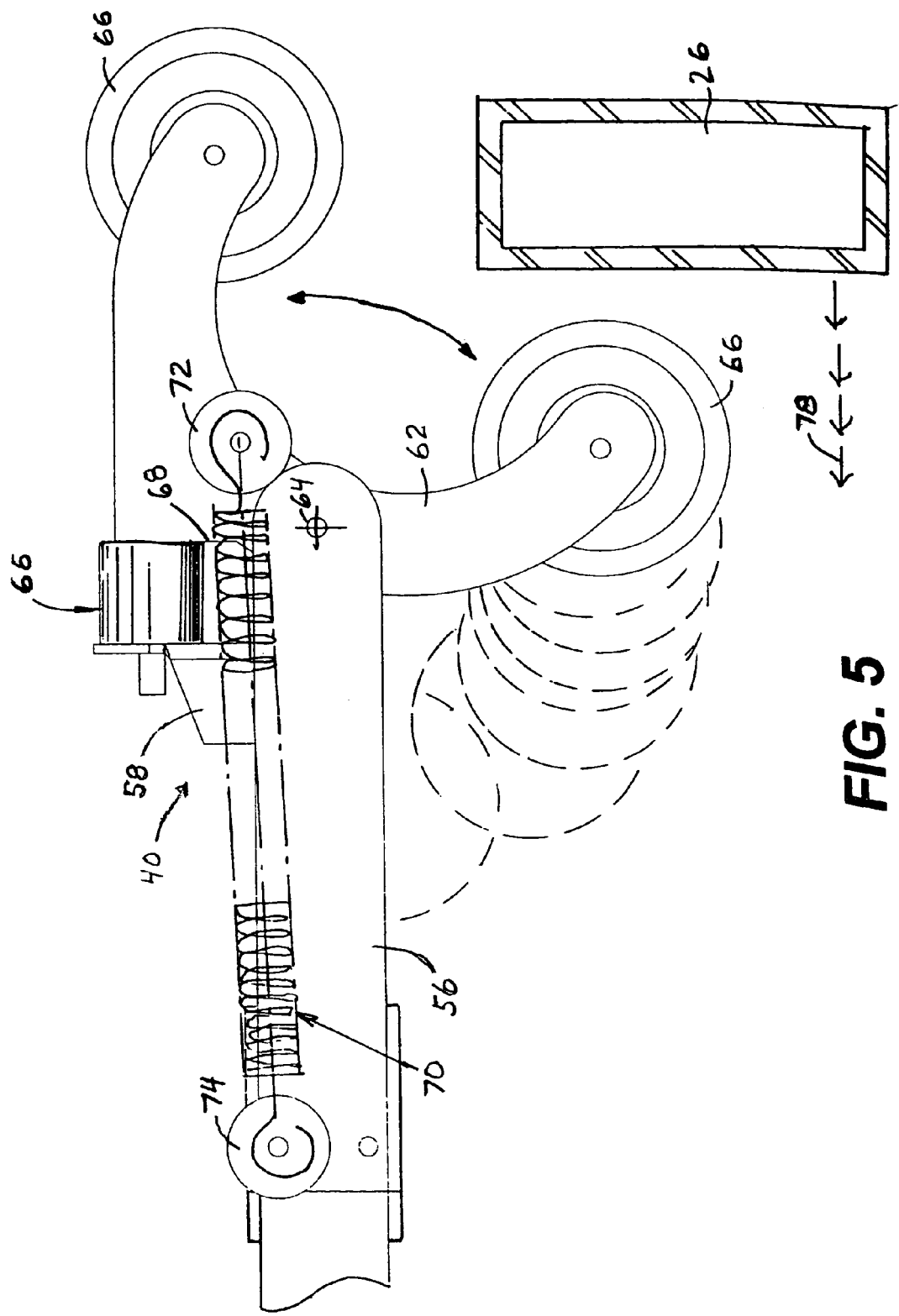

DELAY AND ACCELERATING MECHANISM FOR A WRAP-AROUND BRUSH ASSEMBLY IN A VEHICLE WASHING APPARATUS

BACKGROUND OF THE INVENTION

1. Field of the Invention

The present invention relates to an automatic vehicle washing apparatus and, more particularly, to such an apparatus having a brush arm delay and accelerating mechanism for a wrap-around brush assembly.

2. Description of the Related Art

Numerous devices are known in the art for washing vehicles by employing one or more wrap-around brush assemblies for cleaning one or more of the front, sides and back of a vehicle. Many of these prior art devices are complicated in construction and require the use of extensive power control systems to effect the proper movement of the brush assembly to effectively clean the vehicle. For example, in wrap-around rotating brush assemblies, hydraulic power control systems are often used to move the brush assemblies along the front, sides and back of the vehicle. Such a hydraulic power control systems require close supervision and extensive maintenance and adjustment in order to operate properly. Consequently, these types of devices can be expensive to construct, operate and maintain.

Certain prior art devices, such as that shown in my prior U.S. Pat. No. 4,225,995 employ a single arm for mounting a rotary brush, with the arm being pivoted at a stationary point on an upper frame member which extends overhead of a path of a vehicle to be washed. A pair of such brush supporting arms is provided whereby each brush washes part of the front, one side and part of the back of the vehicle. The direction of rotation of each brush causes it to walk around a vehicle from the front to the back during the washing operation. As shown in prior U.S. Pat. No. 4,225,995, one brush arm is shorter than the other brush arm so that the brushes may fully wash the front and back of a vehicle. While the device shown in this patent is generally satisfactory, the brushes don't always remain in contact with the surface of a vehicle and may jump from time to time thus leaving unwashed portions of a vehicle surface, particularly on the front and back ends of a vehicle.

SUMMARY OF THE INVENTION

It is an object of the present invention to provide a vehicle washing apparatus having a brush support arm provided with a mechanism which holds the arm in better contact with the surfaces of the front and back ends of a vehicle.

It is another object of the present invention to provide a delay mechanism for a wrap-around brush assembly of a vehicle washing apparatus wherein the delay mechanism includes a spring biased, pivotally mounted bracket having a pair of bumpers mounted thereon whereby one of the bumpers contacts a brush support arm during outward pivotal movement of the arm to retard the outward pivotal movement thereof while washing the front end of a vehicle and the other of the bumpers contacts the brush support arm during inward pivotal movement of the arm to accelerate the inward pivotal movement thereof which washing the back end of a vehicle to ensure adequate cleaning of the vehicle.

The present invention achieves the above and other objects by providing a vehicle washing apparatus which includes a supporting frame having an upper frame member extending overhead of a path of a vehicle to be washed and having one or more brush support arms pivotally mounted at a first end to the upper frame member and having a brush rotatably mounted to a second end of the arm. A brush support arm delay and accelerating mechanism is provided which includes a mounting arm adjustably attached to the upper frame member adjacent the brush support arm and having a bracket pivotally mounted to the outer end thereof. The mounting arm may be adjusted in directions laterally of and/or generally crosswise to the upper frame member. Spring biasing means are connected between the bracket and the mounting arm which bias the bracket to a stable stationary position. A pair of bumpers is mounted on the bracket whereby one of the bumpers contacts the brush support arm during outward pivotal movement of the arm to retard the outward pivotal movement and the other of the bumpers contacts the brush support arm during inward pivotal movement of the arm to accelerate the inward pivotal movement thereof during a vehicle washing operation. This construction tends to keep the brush in contact with the front and back ends of the vehicle and ensures a more adequate cleaning operation.

These, together with other objects and advantages, which will be subsequently apparent, reside in the details of construction and operation as more fully hereinafter described and claimed, reference being made to the accompanying drawings forming a part hereof, wherein like numerals refer to like parts throughout.

BRIEF DESCRIPTION OF THE DRAWINGS

FIG. 5 is a side elevational view similar to FIG. 4 except the bracket is shown pivoted to in an open position when the brush arm is in a fully extended position prior to inward pivotal movement of the arm.

DETAIL DESCRIPTION OF THE PREFERRED EMBODIMENTS

Figure 1:
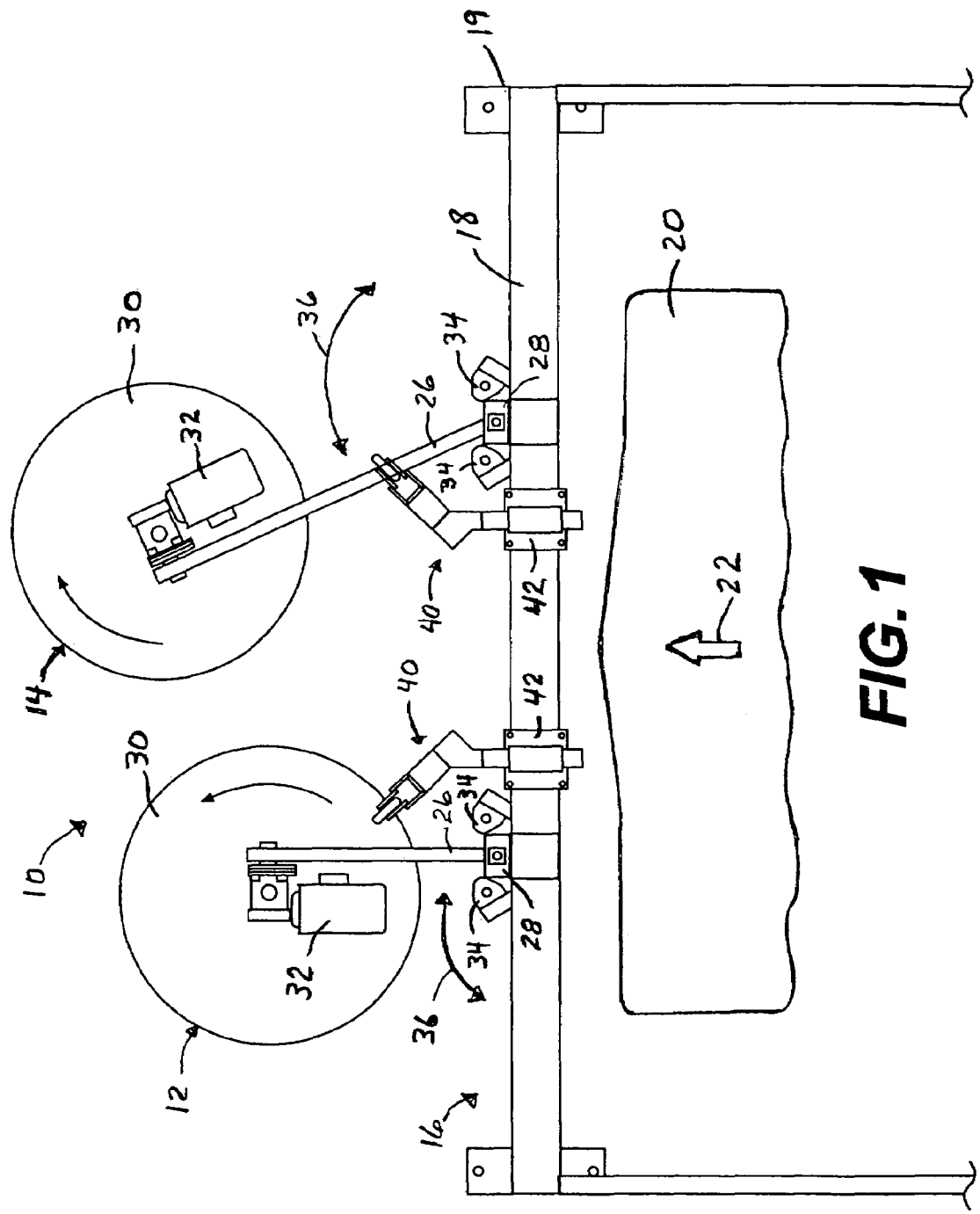
FIG. 1 is a top plan view of a vehicle washing apparatus according the present invention illustrating a pair of wrap-around brush assemblies each provided with an arm delay and accelerating mechanism.

Applicant's invention provides a brush arm delay and accelerating mechanism for a wrap-around brush assembly of an automatic vehicle washing apparatus.

Referring now to FIGS. 1-5 of the drawings, a vehicle washing apparatus 10 according to the present invention is shown comprising a pair of brush assemblies 12 and 14 mounted to a support frame 16. The support frame 16 includes an upper frame member 18 extending laterally across the path of a vehicle 20 being washed. The path of the vehicle is indicated by the arrow 22. The upper frame member 18, also known as a top bulkhead, is supported by vertical frame members 19 extending upwardly from a base surface.

The brush assemblies 12, 14 each includes a brush support arm 26 pivotally mounted at a first inner end to frame member 18 by a brush arm bracket 28 and having a rotary brush 30 rotatably mounted at an outer end for rotation by a motor 32. A stopper 34 of any suitable material such as rubber is mounted to frame member 18 on both sides of the brush arm bracket 28 to limit the extent of pivotal movement of brush arm 26.

The brush support arms 26 of the brush assemblies 12 and 14 are of different lengths in order to enable the brushes to overlap towards the center of a vehicle as they pivot in the directions indicated by the arrows 36.

Figure 2:
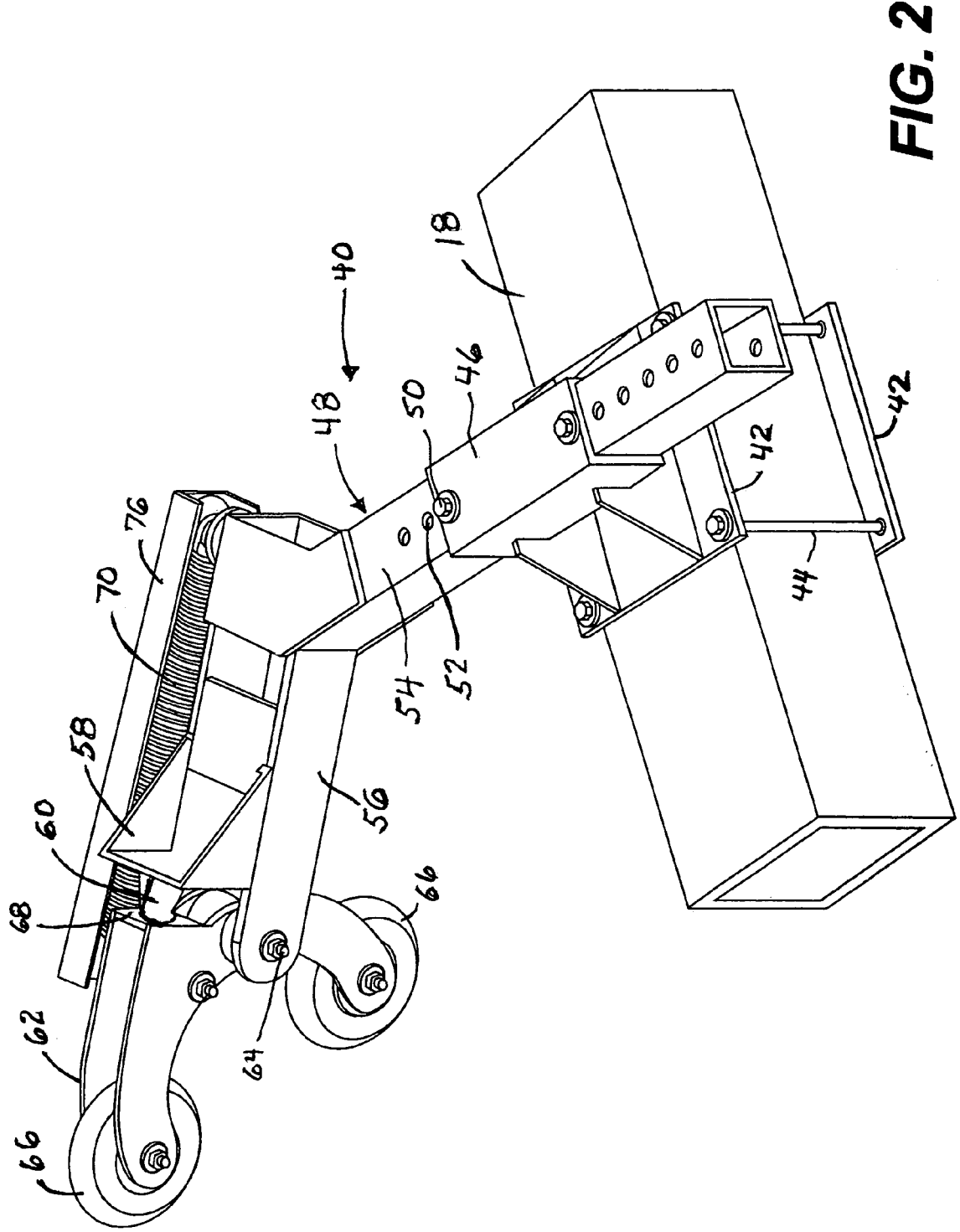
FIG. 2 is an enlarged perspective view of an arm delay and accelerating mechanism taken from the rear thereof.
Figure 3:
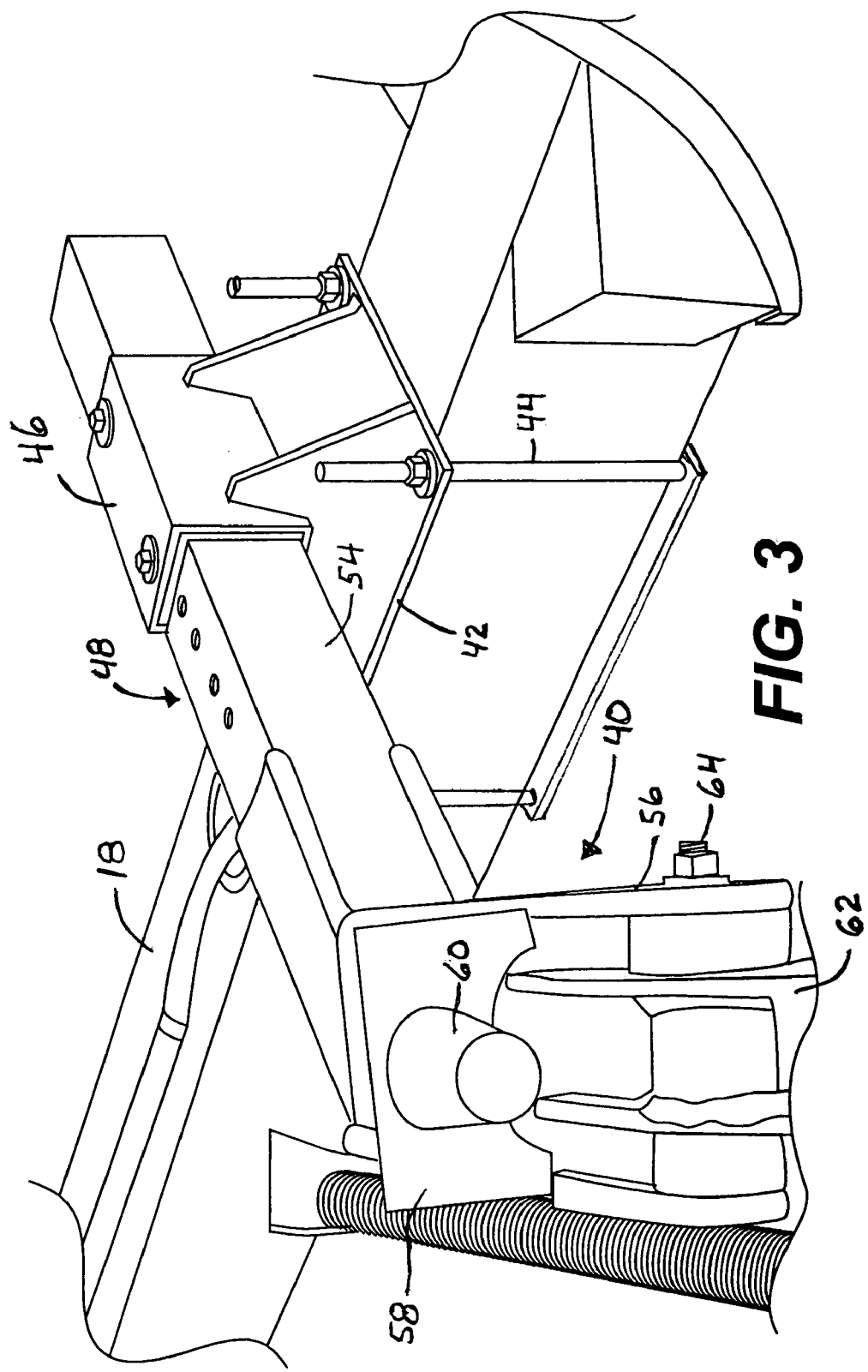
FIG. 3 is enlarged perspective view of a portion of the arm delay and accelerating mechanism taken from the front thereof.
Figure 4:
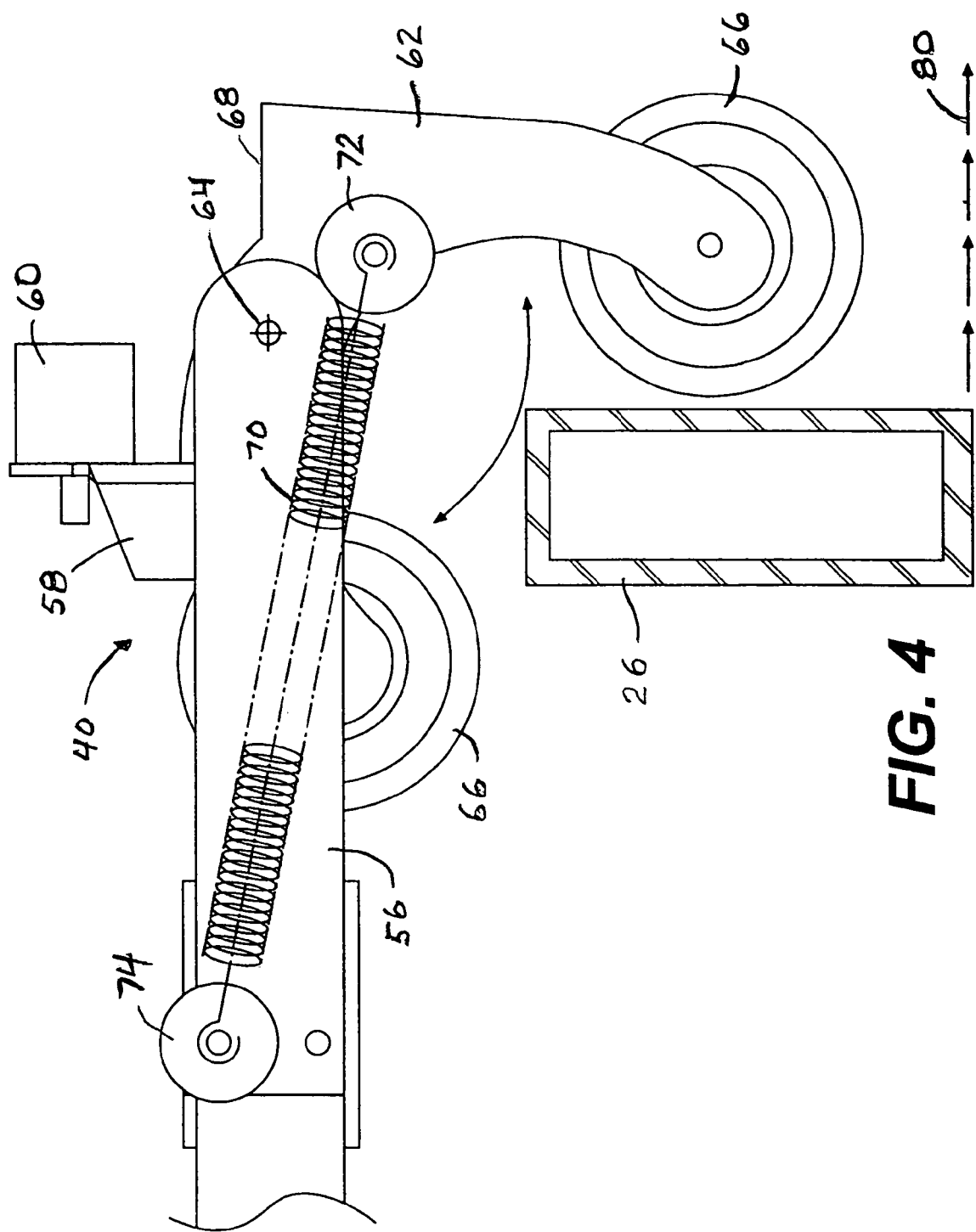
FIG. 4 is a side elevational view of the arm delay and accelerating mechanism showing a brush arm positioned between a pair of roller bumpers of a bracket pivotally attached to a mounting arm with the bracket being in a normal closed or home position when the brush arm is in a normal home position prior to outward pivotal movement of the arm.

As shown in FIG. 1, a brush support arm delay and acceleration mechanism, generally indicated by the numeral 40, is provided for each brush assembly 12 and 14. Since both brush support arm delay and acceleration mechanisms are of the same construction, only one will be described in detail as shown in FIGS. 2, 3 and 4. The brush support arm delay and acceleration mechanisms are mounted on the upper frame number 18 at positions inside of the brackets 28 mounting the brush assemblies 12 and 14 as shown in FIG. 1.

As most clearly shown in FIGS. 2 and 3, each brush support arm delay and acceleration mechanism 40 is comprised of a sandwich plate mounting bracket constructed of two spaced plates 42 attached to upper frame member 18 by bolts 44. By loosening bolts 44, the plates 42 may be adjusted laterally of upper frame member 18 to a desired position. A slider tube 46 is fixedly mounted to the top of the upper plate 42 of the sandwich plate mounting. A mounting arm 48 is slidebly received within the slider tube 46 and held at a desired position by bolts 50 which extend through the slider tube 46 and the openings 52 in the mounting arm. With this construction, the mounting arm 48 may be adjusted inwardly and outwardly in a direction crosswise of the upper frame member 18.

Mounting arm 48 is comprised of a first tubular portion 54 containing the openings 52 therein and a double walled, rectangular second portion 56 attached to the outer end of the tubular portion 54 at an obtuse angle. A triangular bracket 58 is fixedly mounted to the top of the rectangular portion 56 and has a truncated cone shaped rubber stopper 60 attached to the end wall thereof.

A generally U-shaped wishbone bracket 62 is pivotally mounted to the outer end of rectangular portion 56 of the mounting arm 48 by a pivot pin 64 which constitutes a pivot point for the wishbone shaped bracket. A bumper 66 is mounted at each end of the wishbone bracket 62. While roller bumpers are illustrated in the drawings, stationary bumpers may also be employed. The bumpers 66 may be made of any suitable resilient material such as rubber. As shown in FIGS. 1, 4 and 5, the roller bumpers 66 engage a brush arm 26 during pivotal movement of the brush support arm. The wishbone bracket 62 is provided with a central shoulder portion 68 which contacts rubber stopper 60 when the wishbone bracket is in the home position shown in FIGS. 2 and 4.

Wishbone bracket 62 is biased by a tension spring 70 attached at its outer end to a first spring spool 72 mounted on wishbone bracket 62 and at its inner end to a second spring spool 74 mounted on the outside of double walled rectangular portion 56 of mounting arm 48. The center of spring spool 72 is mounted to wishbone bracket 62 at a position offset from the pivot point 64 in a direction beyond the pivot point as shown in FIGS. 4 and 5. The spring 70 is enclosed by a U-shaped cover 76.

In operation of the brush support arm delay mechanism of the present invention, when the brush support arm is in a normal closed or home position as shown in FIG. 4, the wishbone bracket 62 is pivoted to the position wherein shoulder 68 contacts rubber stopper 60. As the brush support arm pivots and moves outwardly in the direction of the arrows 80, shown in FIG. 4, it contacts the lower rubber roller bumper 66 and causes the wishbone bracket to pivot backwardly as shown by the dotted lines in FIG. 4. When the brush support arm moves the lower rubber roller bumper 66 backwardly a sufficient distance while traveling across the front end of a vehicle, the second spring spool 72 moves from a position shown in FIG. 4 above the pivot pin 64 to a position below and beyond the pivot point 64 as shown in FIG. 5 wherein the spring tensions the wishbone bracket 62 to an open position when the brush arm is in a fully extended position. By contrast, when the wishbone bracket. 62 is in the closed or home position shown in FIG. 4, the tension spring 70 biases the wishbone bracket 62 against the rubber stopper 60. Thus, the pivot pin 64 constitutes a neutral pivot point and when the spring spool 72 is moved to either side of the pivot point, the spring snaps the wishbone bracket to that side. This construction is known as an over-center device.

As the brush support arm 26 pivots outwardly, the spring biased lower roller bumper 66 exerts a pressure on the arm to retard or slow its outward pivotal movement to ensure an adequate washing of the front end of a vehicle. Conversely, when the arm 26 pivots inwardly as shown by the direction of the arrows 78 in FIG. 5 during washing of the back end of a vehicle, the arm contacts the lower roller bumper to cause the wishbone bracket 62 to pivot downwardly so that the spring 70 biases the upper roller bumper against the outside of the arm 26 to cause the arm to accelerate during its movement across the back of the vehicle. This ensures an adequate washing of the back of the vehicle as the vehicle moves through the washing apparatus in a direction away from the rotary brush 30.

The rubber roller bumpers 66 thus act to both retard and accelerate the pivotal movement of the brush support arm as the brush support arm undergoes pivotal movement during a vehicle washing operation. By retarding the pivotal movement of the brush support arms during outward pivotal movement, the brushes are caused to linger longer on the front end surfaces of the vehicle to ensure an adequate washing operation. Conversely, by accelerating the inward pivotal movement of the brush arms across the back end surfaces of the vehicle, the brushes stay in better contact as the vehicle moves away from the brushes.

Numerous other modifications and adaptations of the present invention will be apparent to those skilled in the art and thus, it is intended by the following claims to cover all such modifications and adaptations which fall within the true spirit and scope of the invention.

The invention claimed is:

1. A vehicle washing apparatus comprising:
    a supporting frame adjacent a path of a vehicle to be washed;
    a brush support arm having a first end pivotally mounted to said frame;
    a brush rotatably mounted to a second end of said brush support arm; and
    a brush support arm delay and accelerating mechanism comprising:
        a mounting arm attached to said frame adjacent said brush support arm;
        a bracket pivotally mounted to said mounting arm; and a pair of bumpers mounted on said bracket whereby one of said bumpers contacts said brush support arm during outward pivotal movement of said brush support arm to retard the outward movement thereof and the other of said bumpers contacts said brush support arm during inward pivotal movement of said brush support arm to accelerate the inward pivotal movement thereof during a vehicle washing operation.

2. A vehicle washing apparatus according to claim 1, wherein said supporting frame includes an upper frame member extending laterally overhead of said path and means are provided for attaching said mounting arm to said upper frame member whereby said mounting arm is adjustable laterally and crosswise of said upper frame member.

3. A vehicle washing apparatus according to claim 1, which further includes biasing means which bias said bracket to a stationary position.

4. A vehicle washing apparatus according to claim 3, wherein said biasing means comprises a spring connected at a first end to said mounting arm and at a second end to said bracket.

5. A vehicle washing apparatus according to claim 4, wherein said bracket is pivotally mounted to said mounting arm at a pivot point located intermediate of the length of said bracket.

6. A vehicle washing apparatus according to claim 5, wherein said second end of said spring is connected to said bracket at a position offset from said pivot point in a direction beyond said pivot point.

7. A vehicle washing apparatus according to claim 1, wherein each of said bumpers comprises a roller mounted adjacent an end of said bracket.

8. A vehicle washing apparatus according to claim 1, wherein said bracket is generally U-shaped in configuration.

9. A vehicle washing apparatus according to claim 8, which further includes a stopper bumper on said mounting arm to stop pivotal movement of said bracket in one direction.

10. A vehicle washing apparatus comprising:
    a supporting frame having an upper frame member extending overhead of a path of a vehicle to be washed;
    a brush support arm pivotally mounted at a first end to said upper frame member;
    a brush rotatably mounted to a second end of said brush support arm; and
    a brush support arm delay and accelerating mechanism comprising:
    a mounting arm adjustably attached to said upper frame member;
    a bracket pivotally mounted to said mounting arm;
    a spring biasing means connected between said bracket and said mounting arm which bias said bracket to a stationary position;
    a pair of roller bumpers mounted on said bracket whereby one of said roller bumpers contacts said brush support arm during outward pivotal movement of said brush support arm to retard the outward pivotal movement thereof and the other of said roller bumpers contacts said brush support arm during inward pivotal movement of said brush support arm to accelerate the inward pivotal movement thereof during a vehicle washing operation.

11. A vehicle washing apparatus according to claim 10, which further includes a stopper bumper on said mounting arm to stop pivotal movement of said bracket in one direction.

* * * * *